United States Patent [19]

Tanaka et al.

[11] Patent Number: 4,514,641
[45] Date of Patent: Apr. 30, 1985

[54] APPARATUS FOR RETRIEVING INFORMATION

[75] Inventors: Kano Tanaka, Yokohama; Yoshio Ando, Chigasaki; Hitoshi Yanagawa, Tokyo, all of Japan

[73] Assignee: Canon Kabushiki Kaisha, Tokyo, Japan

[21] Appl. No.: 424,635

[22] Filed: Sep. 27, 1982

[30] Foreign Application Priority Data

Nov. 9, 1981 [JP] Japan .................. 56-179429
Nov. 9, 1981 [JP] Japan .................. 56-179430

[51] Int. Cl.³ .............................. G06K 7/10
[52] U.S. Cl. .................. 250/570; 250/557; 353/26 A
[58] Field of Search ............ 353/26 A, 26 R; 250/570, 557; 355/41; 360/72.2

[56] References Cited

U.S. PATENT DOCUMENTS 3,290,987 12/1966 James et al. .......... 353/26 A
3,708,677 1/1973 Volk et al. ............ 353/26 A
3,809,910 5/1974 Nellis ................... 353/26 A
4,066,872 1/1978 Karp et al. ............ 353/26 A

FOREIGN PATENT DOCUMENTS

54-153629 4/1979 Japan ................. 353/26 A
55-93140 7/1980 Japan ................. 353/26 A

Primary Examiner—David C. Nelms
Assistant Examiner—Jim Gatto
Attorney, Agent, or Firm—Fitzpatrick, Cella, Harper & Scinto

[57] ABSTRACT

The present invention provides a retrieving apparatus for retrieving desired information contained in a film making use of retrieval marks recorded on the film. The retrieving apparatus is useful for many different types of films having retrieval marks recorded in different marking modes. The retrieving apparatus comprises mark detector exchangeable according to the marking mode, a device for generating a coded signal corresponding to the exchange of mark detector and a display for making a display of the type of film usable in the apparatus in the present state of exchange of mark detector in response to the coded signal.

4 Claims, 12 Drawing Figures

APPARATUS FOR RETRIEVING INFORMATION

BACKGROUND OF THE INVENTION

1. Field of the Invention

The present invention relates to apparatus for automatically retrieving desired information contained in a film by the detection of retrieval marks provided on the film.

2. Description of the Prior Art

The above-mentioned type of retrieving apparatus is known in the art and is often used in a microfilm reader. Generally, the film for use in such retrieving apparatus has marks provided along one or both sides of the film in the relation of one mark to one frame. In retrieving the frame having the desired information to be retrieved, the marks are detected one by one by a mark detector and the detected marks are serially counted by a counter.

The operator makes an input of the number of the desired information by the keyboard of the apparatus to start the retrieving operation. The film is then moved and the marks on the film are illuminated. The mark detector having one or more photoelectric transducer elements detects the light signal from the mark and produces a detection signal which is applied to the counter. The content of the counter and the input information number are continuously compared with each other by a comparator. When the content of the counter becomes equal to the number of the desired information, the comparator issues a stop signal which is applied to a drive control circuit. In response to the stop signal, the control circuit stops the film driving system. Thus, the desired information is located at a determined position where the information is projected on a screen.

In practical use of the above-mentioned type of information retrieving apparatus, however, there is a difficult problem relating to the retrieval marks provided on the film. Until now, the marking mode (size, form and position) or retrieval marks on the film has not been standarized. Therefore, the films for use in the above retrieving apparatus available on the market at present are not the same in the marking mode. There are used many different marking modes. This means that only one kind of film can be used in one retrieving apparatus. If another kind of film is used in the retrieving apparatus, it will cause some troubles. For example, the film may be stopped at a position deviated from the determined stop position or the apparatus will fail to retrieve the desired information.

The problem can not be solved in a simple manner. It will be required that a film reader be provided with many retrieving apparatus corresponding to many different kinds of films having different marks in respect of the shape and position of the mark. Of course, this solution involves the problem of extremely high cost. Otherwise, it will be required to exchange from one mark detector into another mark detector according to the kind of the film then loaded on the apparatus. However, this solution often leads the operator to a mistake in selecting the mark detector. If the operator once selected any wrong mark detector to the film in which the desired information is to be retrieved, there would occur the same trouble as above. For example, again the film may be stopped at a wrong position for the desired information or the retrieving apparatus may fail to retrieve the desired information.

On the other hand, at present there are two different types of films adapted for the information retrieving apparatus. One is the type in which one and the same kind of marks are provided for all pieces of information contained in a film. The marks to be detected are all the same in size and form. The other type is of such film in which a great number of pieces of information recorded thereon are classified into a plural number of groups according to the item of information, and different kinds of marks having different sizes are provided for different groups in the same film. In case of the second type of film, any desired information in the film can be retrieved when the operator makes an input of the retrieval number of the item allotted to the information. For instance, a relatively small size mark is provided for every information classified in a subitem and a relatively large size mark is provided for every information classified in the item. When the operator makes an input of the retrieval number of a subitem and the retrieval number of the item of the desired information, the apparatus retrieves the desired information classified in the subitem and in the item. When the operator makes an input of the retrieval number of the item only, the apparatus retrieves the desired information classified in that item.

If the operator erroneously makes an input of a retrieval number of the second type of film into the apparatus which has now a film of the first type therein, the apparatus can not correctly work for retrieving the desired information. In such case, the apparatus will retrieve wrong information or continue to drive the film up to the end because of the absence of the information corresponding to the input retrieval number. The operator can not become aware of his mistake before the wrong information has been retrieved by the apparatus or the film has been fed vainly up to its end. Therefore, it takes a long time before the operator has become aware of such mistake. This reduces the efficiency of the retrieving work to a great extent. Those operators who are not skilled in the retrieving work often make such mistake.

SUMMARY OF THE INVENTION

Accordingly it is an object of the present invention to provide an information retrieving apparatus which can solve the above problems involved in the conventional retrieving apparatus.

It is another object of the invention to provide an information retrieving apparatus which can eliminate errors of operation as mentioned above.

It is a further object of the invention to provide an information retrieving apparatus which is useful for different kinds of films having retrieval marks recorded in different marking modes and which can correctly retrieve desired information in the film irrespective of the kind of the film used.

Other and further objects, features and advantages of the invention will appear more fully from the following description taken in connection with the accompanying drawings.

BRIEF DESCRIPTION OF THE DRAWINGS

FIG. 9 composed of FIG. 9A and FIG. 9B show a concrete form of the control circuit.

DESCRIPTION OF THE PREFERRED EMBODIMENTS

Figure 1:
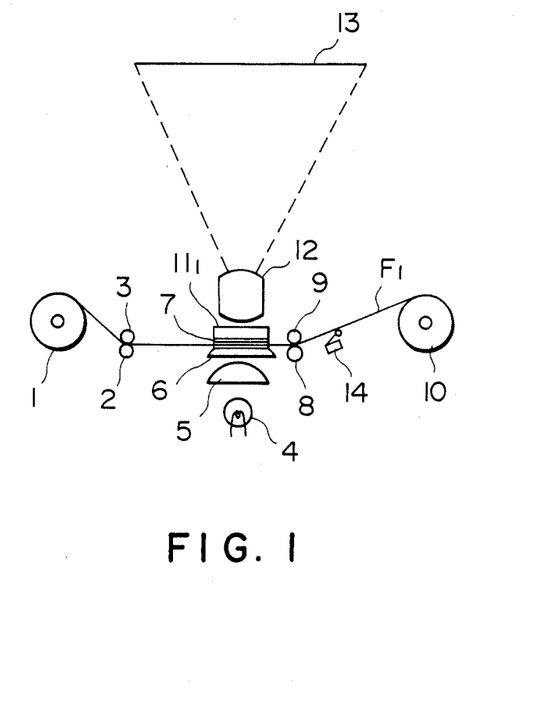
FIG. 1 is a schematic illustration of the arrangement of a microfilm reader in which the present invention is embodied.

In FIG. 1 showing a microfilm reader provided with a retrieving apparatus according to the invention, 1 is a supply reel having a roll of microfilm. 2 and 3 are a pair of film guide rollers. 4 is a lamp for illuminating the microfilm and 5 is a condenser lens. 6 and 7 are glass plates disposed opposite to each other with the interposition of the film path therebetween. 8 is a capstan roller and 9 is a pinch roller in pressure contact with the capstan roller. 10 is a film take-up reel. The supply reel 1 and the take-up reel 10 are operationally connected with a film tension and take-up motor not shown. The capstan roller 8 is connected with a reversible film feed motor. A determined length of film segment F1 extends between the supply reel 1 and the take-up reel 10. When the capstan roller 8 is driven into rotation forward or backward, the microfilm F1 is moved toward the take-up reel 10 or moved back toward the supply reel 1.

$11_1$ is a mark detector, 12 is a projection lens and 13 is a screen. A frame of the microfilm F1 just lying between the glass plates 6 and 7 is illuminated by the lamp 4 and the information recorded in the frame is projected on the screen with a selected magnification.

Figure 2:
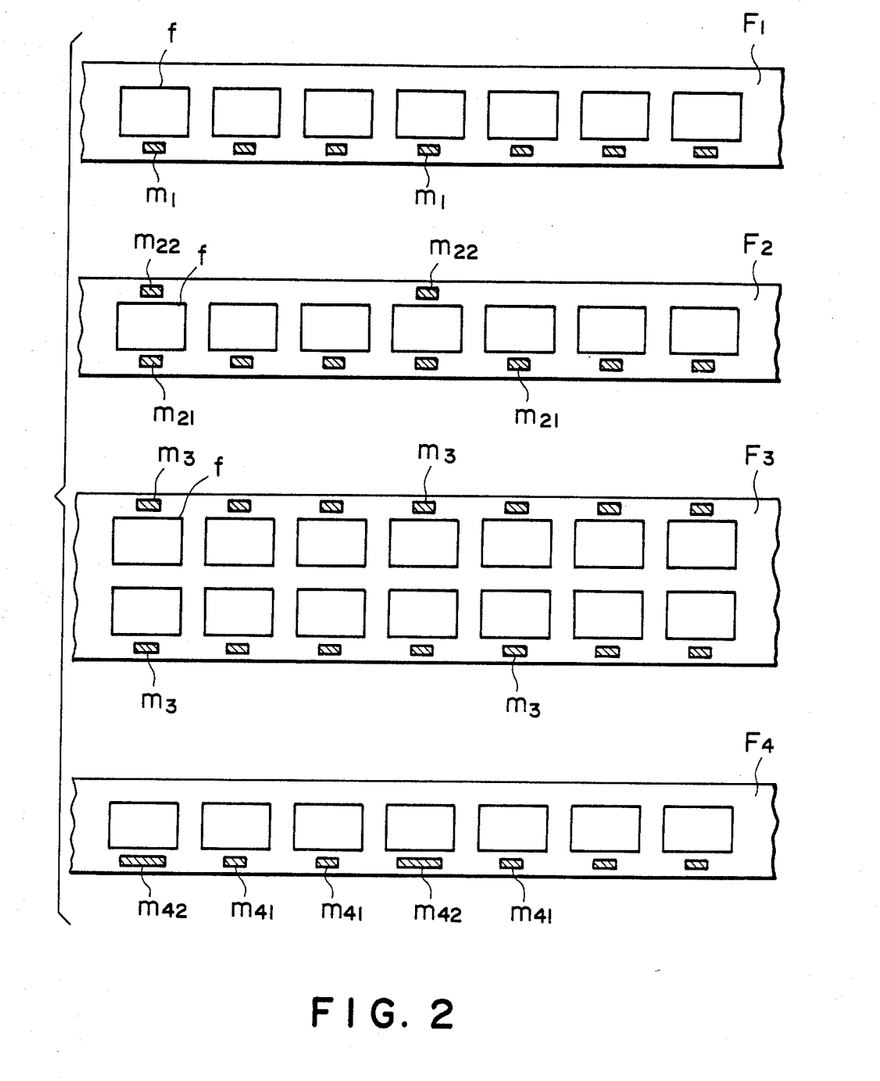
FIG. 2 illustrates some different examples of microfilm useful for the film reader shown in FIG. 1.

FIG. 2 shows four examples of film F1, F2, F3 and F4 for use in the above shown microfilm reader. These four films are different from each other in the making mode of marks recorded thereon.

In case of the microfilm F1, the same kind of frame marks m1 are printed along one marginal side of the film with the relation of one mark m1 to one frame f. Every frame in the film F1 has a piece of information classified in a subitem. The retrieval mark m1 is used to retrieve any desired subitem of information contained in one frame. The density of the frame mark is different from that of the margin of the film. This is the same for other retrieval marks on other films.

In case of the second microfilm F2, frame marks m21 are provided along one side of the film with the relation of one mark m21 to one frame f. In addition, along the other side of the film F2 there are provided group marks m22 for some selected frames only. The frame mark m21 is used to retrieve desired information classified in a subitem and the group mark m22 is used to retrieve desired information in an item. For example, in the case where data (drawing etc.) of many parts of an automobile are recorded in the film, the great number of parts are grouped into a plural number of units. One unit constitutes one item. A group mark m22 is given to a frame in which an exploded view of one unit is recorded. The parts constituting the unit are subitemized. Data of such subitemized parts such as drawing, part number, price etc. of the respective parts are recorded in a frame or frames following the frame marked by the group mark m22. A frame mark m21 is given to every frame containing the data of an subitemized part of the unit.

When this kind of microfilm F2 is used in the retrieving apparatus, the frame containing a record of the exploded view of a desired unit to be retrieved can be searched out in the film by detecting the group mark m22. By detecting the frame m21, data of the desired part of the unit can be retrieved.

While a frame mark m21 is provided also for the frame having a group mark m22, it is not always necessary to provide a frame mark m21 also for the frame having a group mark m22.

In case of the third film F3, picture frames each containing a piece of information recorded thereon are arranged in two lines along the length of the film. Each frame f in the first (lower) line has a frame mark m3 printed in its lower side marginal and each frame in the second (upper) line has a frame mark m3 printed in its upper side margin. The frame marks m3 are all the same in size and form.

In case of the fourth film F4, frame mark 41 and group mark 42 are provided on the same side of the film. The group mark m42 and frame mark m41 are different from each other in size. Measured in the direction along the length of the film F4, the group mark m42 is longer than the frame mark m41. In this embodiment, one group mark m42 is given to the first one of a group of frames in which a series of related information are recorded as one unit. In the frame marked by the group mark m42 there is recorded data of a unit classified in item. In the remaining frames of the group there are recorded subitemized data of the unit respectively.

As will be understood from the above examples, frame marks are used to retrieve subitemized information recorded in the film, that is to say, to retrieve information in frame. On the other hand, group marks are used to retrieve itemized information in the film, that is to say, to retrieve information in a group. As will be described later, the operator can select either one of the retrieval in a frame and the retrieval in a group by use of a retrieval mode selector. When "frame retrieval mode" is selected by the selector, the retrieving apparatus operates to retrieve the desired frame in the film. When "group retrieval mode" is selected, it operates to retrieve only the first frame of the desired group in the film.

The mark detector $11_1$ shown in FIG. 1 is mounted on the main apparatus when the retrieval of information is to be carried out in the first type of film F1 shown in FIG. 2. When the retrieval of information is to be carried out in another type of film F2, F3 or F4, the mark detector $11_1$ is removed from the main apparatus and instead another mark detector as will be described later is mounted according to the type of film loaded on the apparatus.

Figure 3:
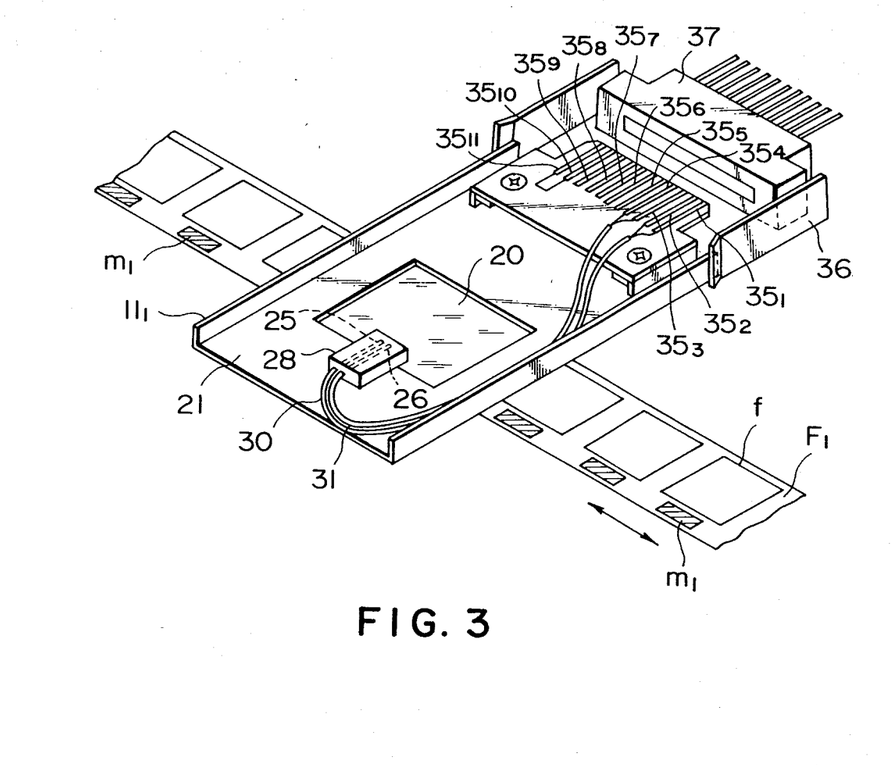
FIG. 3 is a perspective view of the mark detector used in the embodiment.

FIG. 3 shows the details of the structure of the mark detector $11_1$.

Referring to FIG. 3, the mark detector $11_1$ has a movable base plate 21 and a block 28. An opening 20 is formed in the base plate 21 and a pair of photosensor elements 25 and 26 are held by the block 28. Through the opening 20, the paired photosensor elements 25, 26 successively detect the light signals from the marks m1.

The photosensor elements 25, 26 are formed of, for example, phototransistor or photodiodes. The photosensor elements 25, 26 are connected to the corresponding terminals $35_1$–$35_4$ through lead wires 30 and 31 respectively. On one end of the base plate 21 and in parallel to the terminals $35_1$–$35_4$ there are arranged terminals $35_5$–$35_{11}$ of which the terminals $35_9$–$35_{11}$ are terminals for generating coded signals. In case of the mark detector $11_1$, two terminals $35_{10}$ and $35_{11}$ of the coded signal generating terminals $35_9$–$35_{11}$ are short-circuited and a coded signal corresponding to the mark detector $11_1$ is produced out from the terminals $35_9$14 $35_{11}$.

The base plate 21 of the mark detector $11_1$ is removably mounted on a holder 36 provided on the main body of the apparatus. A connector 37 is provided on the holder 36 having terminals corresponding to the terminals $35_1$–$35_{11}$ on the base plate 21. When the mark detector is mounted on the holder in a determined position, the terminals on the base plate 21 and the terminals on the connector 37 are electrically connected each other. The terminals on the connector are connected, on the other side, to a control circuit as will be described later. When the film is fed after mounting the mark detector on the holder 36 in the determined position, the photosensor elements 25, 26 receive the light from the lamp 4 through the film F1. The mark m1 blocks off the light toward the photosensor elements from the lamp 4. At the time, the quantity of light incident on the elements changes accordingly. Thus, a mark detection signal can be obtained from the mark detector. The photosensor elements 25 and 26 are arranged spaced from each other in the direction of film feeding by a distance so as to receive, one after another, the light transmitted through the mark m1.

Figure 4:
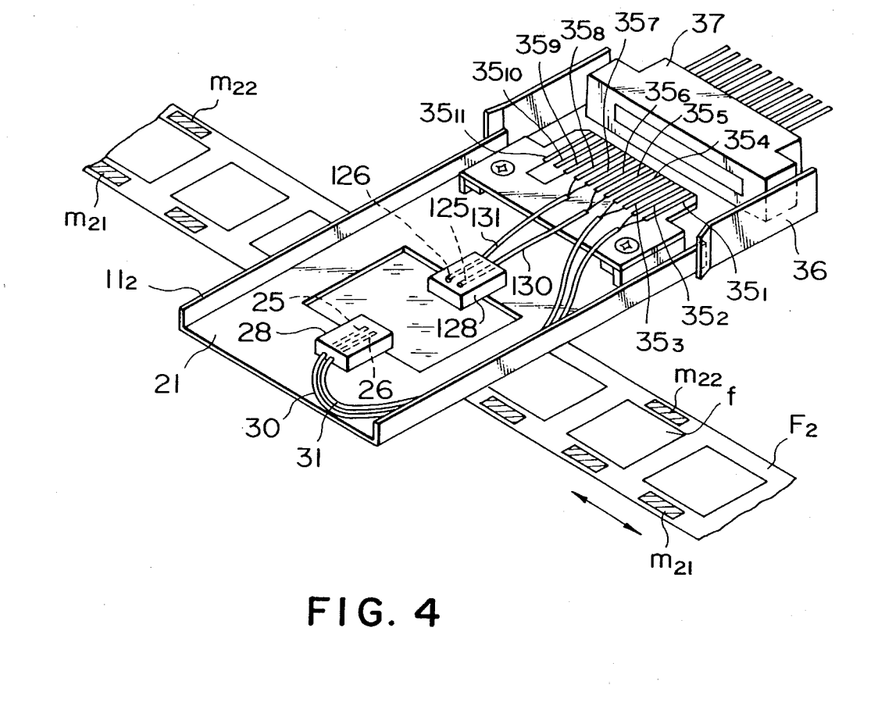
FIGS. 4 to 6 show other embodiments of the mark detector.

FIG. 4 shows a mark detector adapted to the second type of film F2 shown in FIG. 2.

The mark detector $11_2$ is substantially the same as the above mark detector $11_1$ in structure. Like reference characters to FIG. 3 represent the same or corresponding elements.

128 is a block for holding a pair of photosensor elements 125 and 126. The block 128 is fixed on the base plate 21. The photosensor elements 125 and 126 are arranged spaced from each other in the direction of film feeding and connected to the corresponding terminals $35_5$–$35_8$ through lead wires 130 and 131 respectively. The mark detector $11_2$ has, therefore, two pairs of photosensor elements, 25, 26 and 125, 126. The elements 125, 126 are disposed to receive the light transmitted through the mark m22 and the elements 25, 26 to receive the light transmitted through the mark m21. In case of the mark detector $11_2$, two terminals $35_9$ and $35_{11}$ are short-circuited to produce a coded signal corresponding to this mark detector from the coded signal generating terminals $35_9$–$35_{11}$.

Figure 5:
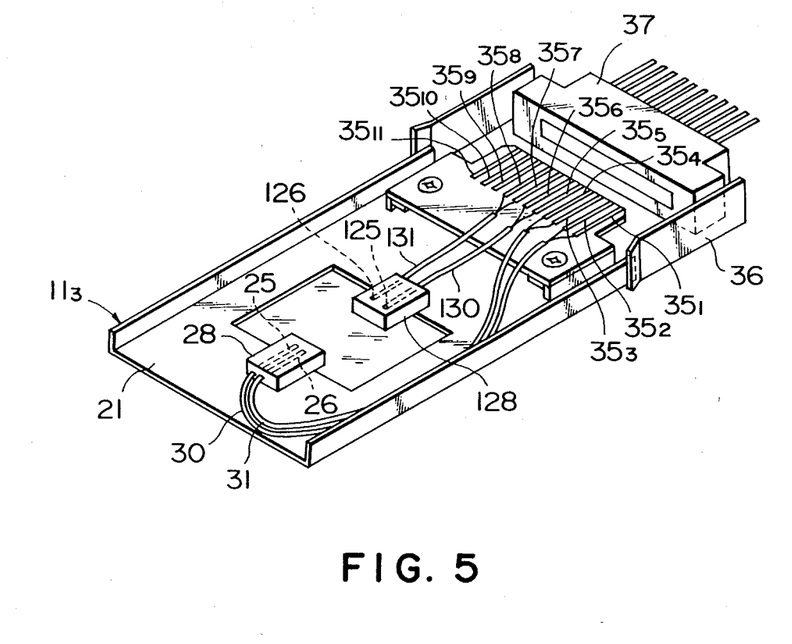

FIG. 5 shows a mark detector adapted to the third type of film F3 shown in FIG. 2. This mark detector 113 has substantially the same structure as the mark detector $11_2$ shown in FIG. 4. But, in this case, the coded signal generating terminals $35_9$–$35_{11}$ are short-circuited relative to each other. To detect marks on both sides of the film F3, the first pair of photosensor elements 25, 26 are disposed to receive the light transmitted through the mark m3 on one side whereas the other pair of photosensor elements 125, 126 are disposed to receive the light transmitted through the mark m3 on the other side of the film F3.

Figure 6:
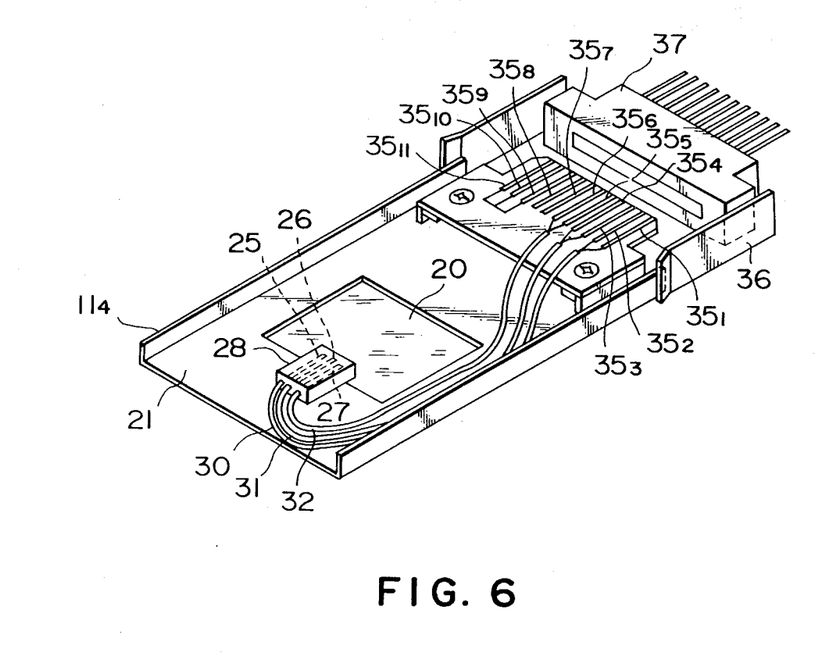

FIG. 6 shows a mark detector adapted to the fourth type of film F4 shown in FIG. 2.

This mark detector $11_4$ has an additional photosensor element 27 in parallel to the above mentioned pair of photosensor elements 25, 26. The photosensor element 27 is spaced from the element 26 by a determined distance and it is connected to terminals $35_5$ and $35_6$ through a lead cable 32. In case of this mark detector $11_4$, the coded signal generating terminals $35_9$–$35_{11}$ are short-circuited reltative to each other. The distance between the photosensor elements 25 and 27 is so measured as to be longer than the frame mark m41 (or its image) but shorter than the group mark m42 (or its image).

Figure 7:
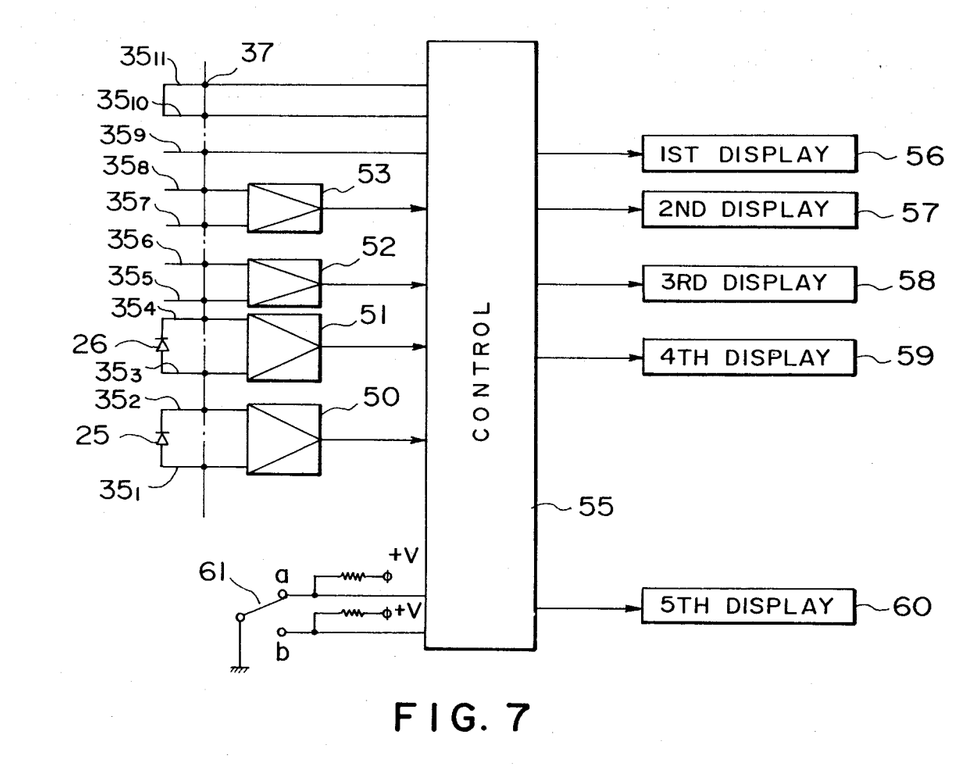
FIG. 7 is a block diagram of the control part of the retrieving apparatus.

FIG. 7 shows the control part of the retrieving apparatus with the first mentioned mark detector $11_1$ being mounted on the main body of the apparatus.

In FIG. 7, 50–53 are amplifiers, 55 is a control circuit and 56–60 are display devices formed of, for example, LED. The mark detection signals from the photosensor elements 25, 26 of the mark detector are introduced into the control circuit 55 through the amplifiers 50, 51 respectively. From a particular combination of the detection signals, the control circuit 55 makes up a count signal which is applied to the counter part. The counter part counts the count signals serially applied from the control circuit. The content of the counter and the number of the desired frame previously introduced from the input device are compared to each other in the comparator part. According to the value resulting from the comparison, a control signal is applied to the motor for driving the capstan roller 8. The control circuit 55 issues also a signal corresponding to the state of short-circuit of the terminals $35_9$–$35_{11}$. The display devices 56, 57, 58 and 59 correspond to the above described mark detectors $11_1$, $11_2$, $11_3$ and $11_4$ respectively. When any selected one of the mark detectors is mounted on the apparatus, a corresponding coded signal is generated from the mark detector in the manner previously described. By this coded signal, a corresponding one of the display devices is exclusively lighted. These display devices 56–60 are arranged on the operation panel 62 shown in FIG. 8. The types of film for which the mark detectors $11_1$–$11_4$ are selectively used are indicated by illustrations of frame arrangements described on the panel in the area near the display devices respectively.

Figure 8:
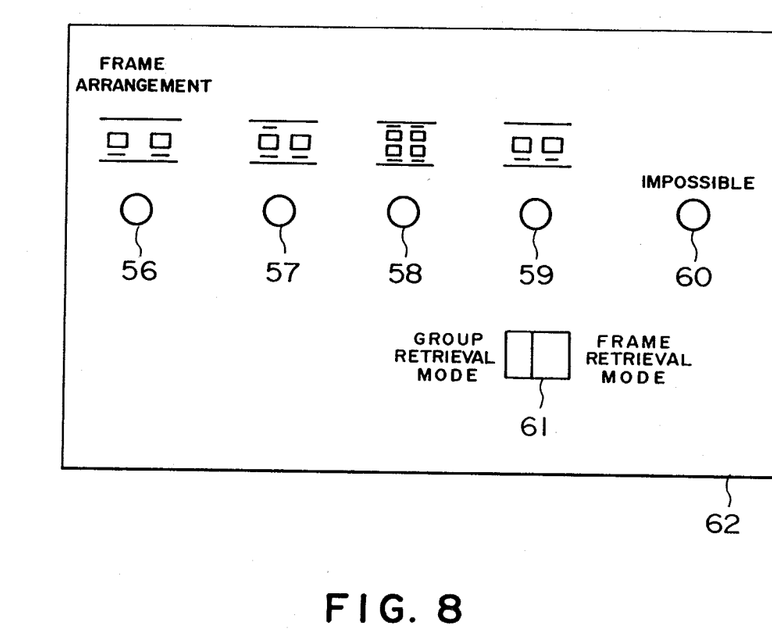
FIG. 8 is a plan view of the operation panel.

In response to the coded signal from the detector now mounted, the control circuit controls the display devices 56–59 in such manner that when the mark detector $11_1$ is mounted, the first display device 56 lights; when the mark detector $11_2$ is mounted, the second display device 57 lights; when the mark detector $11_3$ is mounted, the third display device 58 lights; and when the mark detector $11_4$ is mounted, the fourth display device 59 lights. Therefore, observing the display device now being lighting and the illustration of frame arrangement near the display device on the operation panel 62, the operator can realize for what type of film the retrieving apparatus is now usable (retrieval possible). This prevents the operator's mistake in the selection of mark detector, or in the input of frame number and the malfunction of the retrieving apparatus caused by the operator's mistake.

In FIGS. 7 and 8, 61 is a retrieval mode selector by which the retrieval mode can be switched over between frame retrieval mode and group retrieval mode.

Figures 9, 9B:
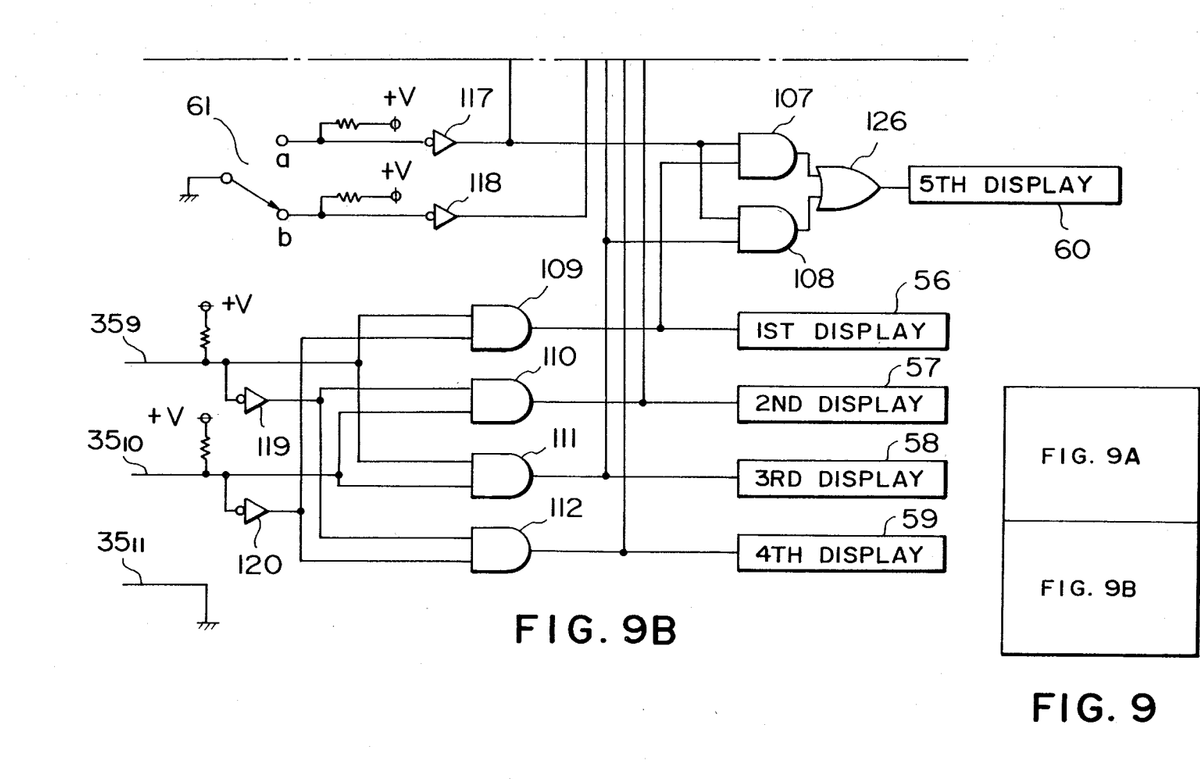
Figure 9A:
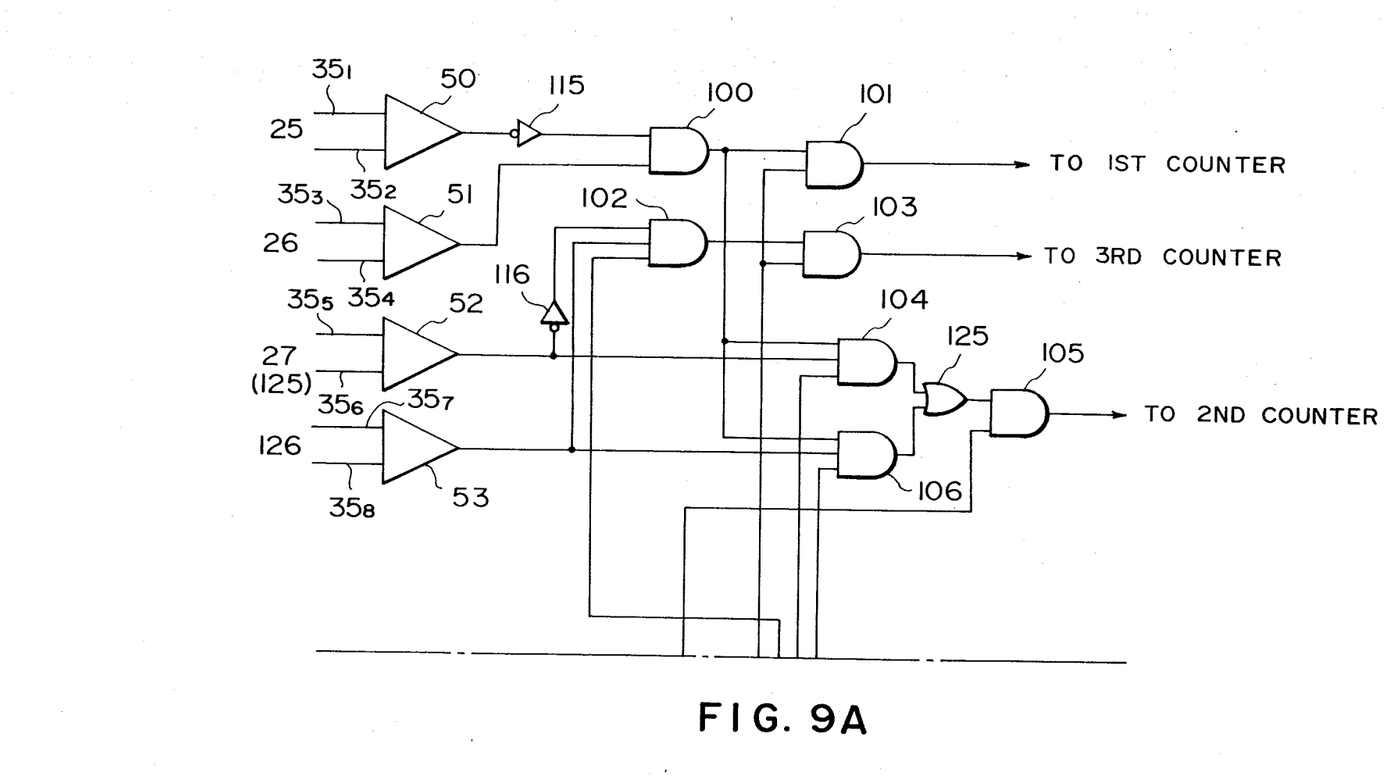

A concrete circuit form of the above control circuit is shown in FIG. 9.

In FIG. 9, 100–112 are AND gates, 115–120 are inverters and 125, 126 are OR gates. With this arrangement of the control circuit, when a mark enters the area between the illumination lamp and a photosensor element of the mark detector, the sensor detects the mark and a high level signal is produced out from the amplifier connected with the sensor. For instance, in the case where the mark detector $11_1$ is mounted on the retrieving apparatus to carry out the retrieval of information in a film of the type F1 having opaque marks m1, the photosensor element 25 or 26 detects a mark m1 when the mark blocks off the light toward the element 25 or 26. At that time, a high level signal is produced out from the amplifier 50 or 51.

The manner or operation of the above apparatus is as follows:

For the retrieval of information in a film of the first type F1, the operator mounts the mark detector $11_1$ on the apparatus and then connects the mode selector 61 to the contact b for frame retrieval mode.

On the mounting of the mark detector $11_1$, AND gate 109 opens and therefore the first display device 56 lights. Observing the lighting display device on the operation panel, the operator makes a check as to whether or not the mark detector now mounted is proper for the type of film now in the apparatus. Having made sure that it is proper, the operator makes an input of the address, that is, the frame number of the desired information to be retrieved, into an input device as will be described later. In response to the input of the frame number, the retrieving apparatus starts to operate for retrieving the desired information. The film is fed in a determined direction. With the movement of the film, the mark detector detects the mark m1 on the film. When one of the two elements, that is, the element 26 detects one mark m1, AND gate 100 opens and therefore AND gate 101 also opens to issue a subitemized frame mark count signal. The count signal is counted by a first counter as will be described later. The content of the first counter is compared to the frame number introduced from the input device. When the content of the first counter becomes coincident with the input frame number, the film is stopped. In this manner, the desired information is retrieved. In the case of a film of the type F1, AND gates 102-106 remain closed.

For the retrieval of information in a film of the type F2, the operator mounts the mark detector $11_2$ on the apparatus. On the mounting of the mark detector $11_2$, AND gate 110 opens and the second display device 57 lights to indicate the type of film now usable in the apparatus. After checking whether or not the selected mark detector and film correspond to the display made on the operation panel, the operator makes an input of the frame number or group number of the desired information to be retrieved to give the apparatus a start instruction. The apparatus starts to operate and the film is fed in a determined direction. In the case where the mode selector 61 is connected to the contact b for frame retrieval mode and the frame number of the desired information is introduced into the input device, AND gates 100 and 101 open when the mark 21 is detected by the photosensor element 26. At the time, a frame mark count signal is issued from AND gate 101. The count signal is counted by the first counter. The operation of the apparatus subsequent to it is entirely the same as above. In the case where the mode selector 61 is switched over to the contact a for group retrieval mode and the group number of the desired information is introduced into the input device, AND gate 106 opens when the mark m21 is detected by the photosensor element 26 and the mark m22 is detected by the element 126 at the same time. By the opening of AND gate 106, AND gate 105 is opened to issue an itemized group mark count signal from the gate 105. The group mark count signal is counted by a second counter as will be described later. The content of the second counter is compared to the input group number. When they come into coincidence with each other, the film is stopped. In this manner, the desired information is retrieved.

When the film F2 is replaced by the film F3, the operator exchanges the mark detector $11_3$ for the above mark detector $11_2$. On the mounting of the mark detector $11_3$, AND gate 111 opens and the display device 58 lights to indicate the proper combination of mark detector and the type of film for the case. Observing the display on the operational panel, the operator makes a check whether his selection of mark detector and film is correct. After checking, the operator connects the mode selector 61 to the contact b for frame retrieval mode and makes an input of the frame number of the desired information in the desired frame line of the film. Then, the operator gives the apparatus a retrieval start instruction. The apparatus starts operating and the film is fed in a determined direction. With the movement of the film, the photosensor element 26 detects the mark m3 on one line. At the detection of the mark, AND gates 100 and 101 open and a frame mark count signal is issued from AND gate 101 and the first counter counts the count signal. When the mark m3 on the other line is detected by the photosensor element 126, AND gates 102 and 103 open and a frame mark count signal is issued from the AND gate 103. This count signal is counted by the third counter. The operation of the apparatus subsequent to it is the same as above and therefore need not be further described.

The input device has a instruction key to instruct in which line the information is to be retrieved.

Lastly, in the case where the retrieval of information is to be carried out in a film of the type F4, the operator mounts the mark detector $11_4$ on the apparatus. The mounting of the mark detector $11_4$, AND gate 112 opens and the fourth display device 59 lights on to indicate the type of film now usable in the apparatus. After checking whether the operator's selection of mark detector and film is correct while observing the display on the operation panel, the operator makes an input of the frame number or group number of the desired information to be retrieved. By a retrieval start instruction the apparatus is brought into operation and the film is fed in a determined direction. If the selector 61 is in contact with the contact a and the input number of the desired information is a group number, then AND gates 105 and 106 open when the mark m42 is detected by photosensor elements 26 and 27 at the same time. AND gate 105 issues a group mark count signal which is counted by the second counter. The operation of the apparatus subsequent to it is entirely the same as above.

If the mode selector 61 is in contact with the contact b for group retrieval mode and the input number of the desired information is a frame number, then AND gates 100 and 101 open when the mark m41 or m42 is detected by the photosensor element 26. At the time a frame mark count signal is put out from AND gate 101 and the first counter counts the number of the count signals. The operation of the apparatus subsequent to it is entirely the same as above and therefore need not be further described.

In the manner described above, the kind of mark detector now mounted on the apparatus as well as the type of film proper to the mounted mark detector are displayed on the operation panel every time when a mark detector is mounted on the apparatus. Therefore, even when the operator has made a mistake in the selection of mark detector and/or film, the display makes the operator aware of the mistake easily and at once before the start of operation of the apparatus. Thereby any malfunction of the apparatus as caused by the operator's mistake can be prevented completely.

Even after the film F1 is loaded on the apparatus and the mark detector 11₁ is mounted on the apparatus or even after the mark detector 11₃ is mounted on the apparatus loaded with the film F3, there may occur such case where the operator erroneously connects the mode selector 61 to the contact a for group retrieval mode. According to the shown embodiment, however, if the operator made such error in switching the mode selector, AND gate 107 or 108 opens and a fifth display device 60 lights to indicate that group retrieval is impossible. During the fifth display device 60 being lighting, the control part inhibits the film driving motor from being driven. Therefore, the operator can realize his mistake in switching the mode selector at once before the start of a retrieving operation.

Figure 10:
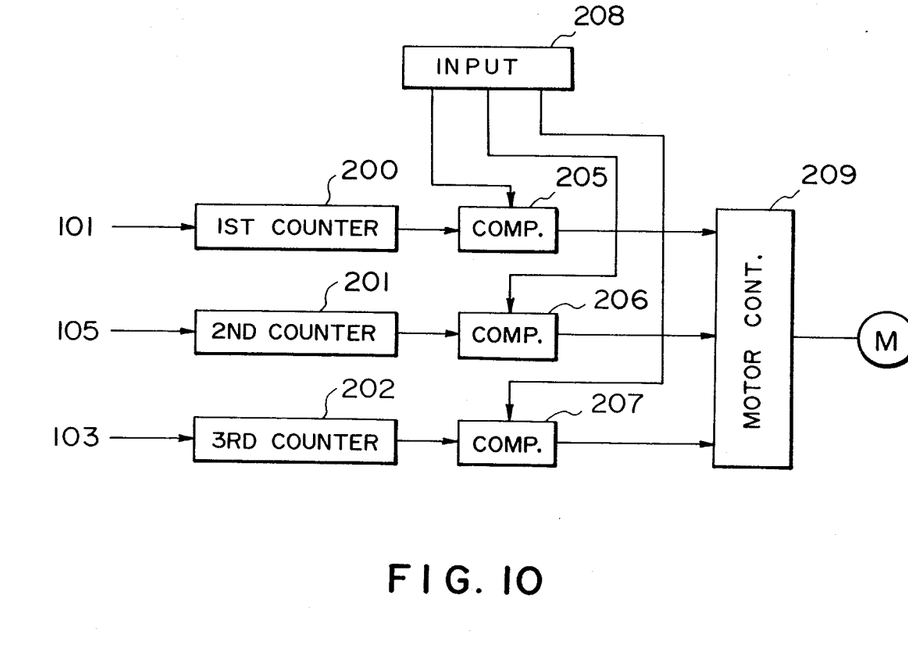
FIG. 10 is a block diagram of the retrieving circuit.

FIG. 10 shows a concrete example of the retrieving circuit.

200-202 are counters, 205-207 are comparators and 208 is an input device. 209 is a motor control circuit which controls the motor M for driving the capstan roller 8.

The first counter 200 counts the number of frame mark count signals coming from AND gate 101. The second counter 201 counts the number of group mark count signals from AND gate 105. The third counter 202 counts the number of frame mark count signals coming from AND gate 103. These counters are formed as up-and-down counter the counting mode of which can be changed over between addition mode and subtraction mode according to the direction in which the film is moved.

The function of the comparators 205, 206, 207 is to make a comparison between the address of the desired information to be retrieved and introduced from the input device 208 and the content of the corresponding counter, and to make an output of a coincidence signal when the input address and the counter content come into coincidence with each other. In response to the coincidence signal, the motor control circuit 209 stops the motor M to terminate the film feed. It is determined by the key operation of the input device 208 to which comparator the input address of the desired information should be applied.

In the above embodiments, one mark has been detected by a pair of photosensor elements, for example, by sensor elements 25 and 26. The reason for this is that the film can be moved in two opposite directions in the apparatus and the retrieved information of the film must be stopped always at a constant stop position irrespective of the direction of film feeding at that time. In the above embodiments, a mark detection signal is generated only when a mark is detected by the photosensor element 26 but not detected by the photosensor element 25 or a mark is detected by 126 but not detected by 125. By doing so, it is assured that the timing of the generation of mark detection signal is kept constant irrespective of the direction of film feeding. The film is stopped at once in response to the generation of the mark detection signal. Therefore, when the film is stopped, the relative positional relation between mark and sensor can be maintained always constant. In other words, according to the above embodiments, the film is stopped when one edge of a mark comes into the area between the two photosensor elements 25 and 26 or 125 and 126 irrespective of the film feeding direction. Thus, any desired information on a film can be stopped at a constant position.

If desired, two or more photosensor elements 26 or 126 may be provided to prevent any error in the retrieval as caused by scratch or dust on the film. If some variation of the film stop position is allowable, the photosensor element 25 or 125 may be omitted from the mark detector.

While the invention has been particularly shown and described with reference to preferred embodiments thereof, it will be understood by those skilled in the art that various changes and modifications may be made without departing from the scope of the invention.

For example, it is not always necessary for the photosensor element to directly receive the light from the mark. The photosensor element may be disposed to receive the light from the mark through a suitable light guide member, for example, through an optical fiber bundle.

Also, the display of the type of film now usable may be carried out otherwise than particularly shown in the above embodiments. For example, the display may be made by selectively illuminating the illustrations of some different kinds of frame arrangement in a film provided on the operation panel.

Also, the type of film now usable in the apparatus may be indicated by numerical display or symbol display.

The types of film used in the invention are never limited to those particularly shown in the embodiments. The invention is applicable to many types of films having retrieval marks provided in various different marking modes. It is essential is to select suitable mark detection means for the type of film now being loaded on the retrieving apparatus. Of course, in this case, said mark detection means should be so designed as to be exchangeable and able to correctly detect the mark printed in a particular mode.

What we claim is:

1. A retrieving apparatus for retrieving a desired image in a selected film by selecting a film having a first mark on the images or a film having at least two marks including the first mark and a second mark selectively applied to the images, said apparatus comprising:

mark detection means for detecting said first mark or said second mark and, when the first mark is detected, for outputting a first mark signal and, when the second mark is detected, for outputting a second mark signal;

counting means having a first counting part for counting said first mark signals output from said mark detention means and a second counting part for counting said second mark signals output from said mark detection means;

control means for controlling the feeding of the film by comparing the retrieving number of the desired image and counting value of the first counting part or the second counting part;

signal generation means for generating a signal corresponding to the film to be used;

mode selecting means for selecting a first retrieving mode utilizing the first mark or a second retrieving mode utilizing the second mark; and display means for indicating the possibility of retrieval under the selected retrieving mode using the selected film on the basis of the signal output from said signal generation means and the signal output from said mode selecting means.

2. A retrieving apparatus according to claim 1, wherein means are provided for preventing film feed when said display means indicates that the retrieval is not possible.

3. A retrieving apparatus according to claim 1, wherein said mark detection means has a plurality of mark detectors corresponding to the kind of the film and the selected mark detector, among the plurality of mark detectors, is placed at a predetermined position in the apparatus.

4. A retrieving apparatus according to claim 1, wherein the apparatus further comprises a display means indicating the type of the film to be used by receiving said signal output from said signal generation means.

* * * * *